United States Patent [19]
Bleier et al.

[11] Patent Number: 5,640,307
[45] Date of Patent: Jun. 17, 1997

[54] CHIP CARD READER

[75] Inventors: Robert Bleier, Bad Wimpfen; Manfred Reichardt, Weinsberg; Bernd Schuder, Schwaigern, all of Germany

[73] Assignee: Amphenol-Tuchel Electronics GmbH, Germany

[21] Appl. No.: 629,067

[22] Filed: Apr. 8, 1996

[51] Int. Cl.[6] ............................................. H05K 1/14
[52] U.S. Cl. .................... 361/740; 361/747; 361/759; 439/188; 200/51.1; 235/441; 235/449
[58] Field of Search ........................... 361/798, 732, 361/730, 737, 740, 741, 747, 752, 755–756, 759, 787, 801, 802–803, 829, 832; 439/188; 235/441, 449, 479, 482–483, 485–486, 492; 200/51.1, 51.09, 51.12

[56] References Cited

U.S. PATENT DOCUMENTS

| | | | |
|---|---|---|---|
| 5,196,680 | 3/1993 | Schuder | 235/449 |
| 5,334,034 | 8/1994 | Reichardt et al. | 439/188 |
| 5,370,544 | 12/1994 | Reichardt et al. | 439/188 |

*Primary Examiner*—Leo P. Picard
*Assistant Examiner*—Anthony Dinkins
*Attorney, Agent, or Firm*—Bacon & Thomas

[57] ABSTRACT

The invention concerns a chip card reader with a housing (10), a guideway (12) provided in the housing (10) for holding a chip card (14), a contact carrier (26), located on the housing, and a locking element (16) which latches behind the chip card in the read position, the locking element consisting of an L-shaped arm.

13 Claims, 3 Drawing Sheets

FIG. 2

CHIP CARD READER

BACKGROUND OF THE INVENTION

1. Field of the Invention

The present invention relates to a chip card reader with a housing, a guideway, provided in the longitudinal direction of the housing, for holding a chip card, and with a contact carrier, located on the housing, whose contacts are capable of making contact with corresponding contacts of the chip card when the chip card is in the read position in the housing, and with a locking element which latches behind the chip card in the read position.

2. Description of the Related Art

Such a chip card reader is known from EP-A-468 179. The function of chip card readers is to make contact with the contacts of the electronic chip disposed on the appertaining card when the card is in a defined end position (read position) in the reader, in order thereby to enable the information on the chip to be "read", but also, if necessary, to enable information to be entered into the chip card.

For the purpose of fixing the chip card in the read position, the known chip card reader has a lever system which, upon the introduction of the card, is impinged upon by a driver and displaced in such a way that a locking hoop of the lever system latches behind the card in the read position by means of a hook.

Chip card readers of the said type should be constructed as small as possible and should not be susceptible to damage or interference. The known lever system can only inadequately meet these requirements, since it necessarily requires a considerable amount of space and is relatively susceptible to the application of mechanical force.

In this connection, the improper use and destruction of such chip card readers constitutes a considerable problem.

SUMMARY OF THE INVENTION

The object of the invention, therefore, is to provide a chip card reader of the known type, which is robust, allows reliable locking of the card in the read position, but which is also preferably protected as far as possible against improper use.

Taking as a basis a chip card reader of the known type, the chip card reader is then characterized by the following features:

- the locking element consists of an L-shaped arm, capable of motion within the housing, in the longitudinal direction of the latter, the short side of the L being aligned towards the chip card;
- the arm is coupled to a driver, located on the housing, which is driven by the chip card on its path into the read position and thereby draws the arm from a position outside the guideway along an oblique face in such a way that the short side of the L-shaped arm latches behind the chip card in the read position; and
- the driver is secured by a locking slide when the chip card is in the read position.

It is firstly of significance that the locking element is formed as a single part, being a L-shaped arm. Thus, according to the invention, the known lever system is replaced by a single arm. This results directly in a substantial simplification of the design and in a reduction of the susceptibility to malfunctioning.

The housing, and its other component parts, are furthermore fashioned to match the L-shaped arm. Accordingly, the housing has an oblique face along which the arm is transferred from a position outside the guideway into a position in which the short side of the L-shaped arm latches behind the chip card in the read position. Accordingly, the arm is moved simultaneously both in the longitudinal direction of the housing (in the direction of insertion of the card) and perpendicularly to the card (along the oblique face). The means by which the arm is guided consist exclusively of the said oblique face and an associated driver located on the housing.

Finally, there is provided a locking slide (locking element) which blocks the driver when the chip card is in the read position, in order to fix the locking position of the arm in respect of the chip card in the read position.

All of the above-mentioned components are preferably disposed above the guideway for the chip card. This allows the reader to be of an overall compact and flat design.

The driver can be fashioned in various ways. According to one design, the arm is only drawn by the driver when the chip card has been inserted so far into the guideway that its rear edge—viewed in the direction of insertion of the card—lies in front of the short side of the L-shaped arm. In this way, the short side of the L-shaped arm, i.e., its locking part, is moved almost exclusively perpendicularly to the card and reliably guided behind the card.

The driver can be connected to the contact carrier, which can itself be fashioned so that it can be guided along an oblique face towards the contacts of the chip card when the chip card is inserted. In this case, movement of the contacts of the chip card relative to the contacts of the contact carrier is avoided: rather, it is only in the contact-making position that each is guided towards the other. In this way, damage to the contacts is largely precluded. In addition, the contacts of the contact carrier can be separated from the guideway for the chap card by a separating element when the reader is in an initial position. Thus, when the reader is in the initial position, in which there is no card in the reader, the contacts of the contact carrier are protected against vandalism. The "protective position" of the separating element relative to the contact carrier is cancelled only when the chip card is inserted in the proper manner (in this embodiment example, it is cancelled by the synchronous movement of the driver and the contact carrier). Once the chip card has attained its end position, the separating element and/or the contact carrier are then moved relative to each other to the extent that the contacts of the contact carrier lie opposite the contacts or the chip card, i.e., the two are brought into contact. Electrical contact is effected by, for example, a known switch for the card.

According to a further embodiment, the driver is fashioned in the form of a frame and the arm is fashioned with a guide stud, on the end opposite to the short side of the L, which projects into and above the frame.

As already described above, the arm is to be drawn after the driver, despite the fact that a single-part construction is possible. In the case of the two-part form, the guide stud of the arm may, for example, be located at a distance in front of the associated driver stop (frame part) when the reader is in the initial position. When the driver is forced forward by the card in the direction of insertion, it accordingly drives the arm only after a certain displacement distance has been attained, the card then having attained a position in which its rear edge lies immediately in front of the short side of the L-shaped arm, as described.

According to a further embodiment, the arm itself is held on the housing under spring load—against the direction of insertion of the chip card. This enables the arm to be guided back into the starting position when the read position is cancelled and the locking hook of the arm to be released from the chip card, as described more fully below. As stated, the locking element (locking slide) selves to fix the driver in the read position. To this end, it can consist of a spring-loaded rocker-type hoop which automatically latches into a corresponding recess in the driver following attainment of the read position (due to the action of the appertaining spring).

A variant is characterized by the fact that the locking slide has a magnetically active section which acts together with an electromagnet which, following activation, attracts the said section and thereby releases the locking slide from its locking position in respect of the driver. For this purpose, the locking slide which, like the arm and the driver, can be composed of plastics, may for example have a metallic section possessing magnetic properties.

If the said chip card reader is used in a telephone, for example, an electrical signal is sent to the electromagnet after the receiver has been replaced. The electromagnet is thereupon activated and attracts the locking slide, releasing it from the locking position in respect of the driver, so that the latter, like the spring-loaded arm, can be brought back into the initial position and thus releases the chip card forwards out of the guideway.

According to an alternative embodiment, the electromagnet is coupled to the electrical signals of the contacts of the contact carrier and is activated at the instant in which contact is broken between the contact carrier and the chip card.

The chip card reader design according to the invention also provides for the option of blocking the driver (and hence the arm) in the initial position and only releasing it when the reader as a whole is energized. For this purpose, the reader is constructed with a switch, disposed in the guideway, which is capable of being activated by the chip card when it is introduced into the guideway and is electrically connected to an electromagnet which, upon activation of the switch, attracts a locking pawl and releases it, against the action of a spring, from a locking position in respect of the driver.

It is apparent that the switch can then only be activated and, accordingly, the locking position in respect of the driver cancelled, if current is passed through the switch (reader) (normal case). However, if the reader is not functioning, for example, then the switch cannot be activated. Accordingly, the locking pawl remains in its locking position with respect to the driver. As a further consequence, it is not possible for a chip card to be guided into the read position; on the contrary, the insertion path of the chip card is terminated as soon as the chip card reaches a corresponding stop (e.g. a driver stop). This embodiment provides for an additional security feature, particularly against malicious destruction of the reader, when the latter is not in service.

The locking pawl can be fashioned so that when it is in its locking position it engages, by means of a hook-type projection, in a corresponding recess on the outside of the driver.

In order to ensure that the card can be withdrawn in this embodiment also (following cancellation of the read position), there is provision for the electromagnet to be designed so that it releases the locking pawl immediately after the chip card has attained the read position. It can then, accordingly, re-latch into the corresponding recess in the driver as soon as the driver has attained its initial position.

For this purpose, the hook-type projection and a corresponding section of the driver can be fashioned with appropriate oblique faces which facilitate the feeding of the hook-type projection when the driver is guided back into the initial position, before the hook-type projection latches back into the recess in the driver, this being due to the action of the said tension spring.

The chip card reader described is characterized by a simple construction and a multiplicity of security features. These include the fact that, following insertion of a chip card, the guideway is blocked by the short side of the L-shaped arm latching behind the card, so that no other card can be fed in when the read position is active or whenever a chip card can no longer be removed from the reader for whatever reason.

Further characteristics of the invention are stated in the sub-claims and further descriptions, which also include the following description of the figures.

The invention is described more fully below with reference to an embodiment example. The representations—in schematic form in each case—follow.

DETAILED DESCRIPTION OF THE PREFERRED EMBODIMENT

The chip card reader consists of a housing 10, in which there is provided, in the longitudinal direction, a guideway 12 for a chip card 14.

Figure 1:
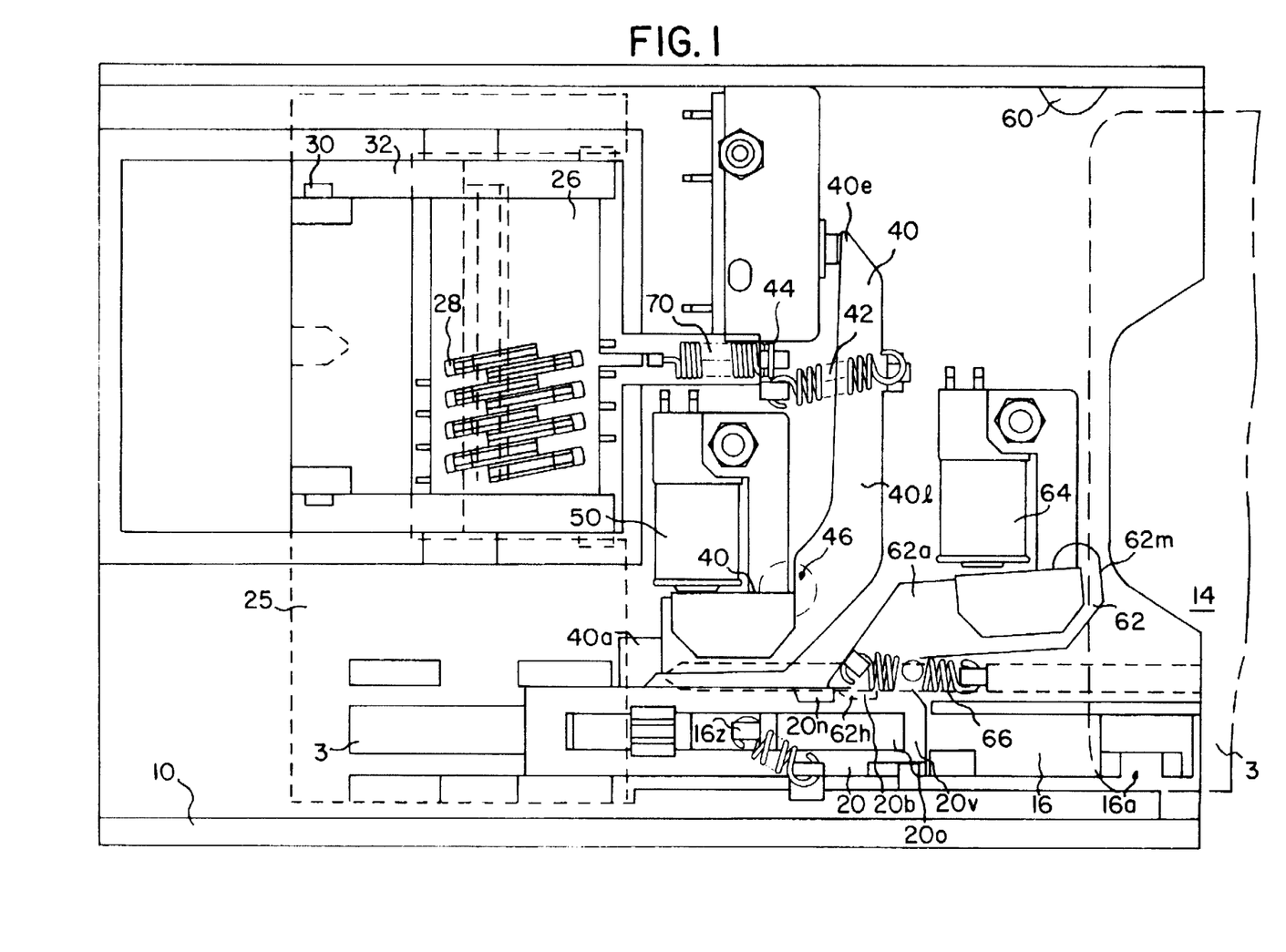
FIG. 1: a top view of a chip card reader in the initial position.

In FIG. 1, the direction of insertion of the chip card 14 is indicated by the arrow E.

Running above the guideway 14, in the direction of insertion to the left, there is an L-shaped arm 16 which has a lateral recess 16a at its front end and a projection 16b, projecting forwards towards the chip card 14, which has an oblique face 16s, in the direction of insertion of the chip card (arrow E), which acts together with a corresponding oblique face 18 of the housing 10, as described more fully below.

On its end (at 16e) which is opposite to the projection 16b, the arm 16 has a guide stud 16z, projecting upwards, which passes through an opening 20o of a driver 20, fashioned in the form of a frame, and protrudes upwards.

Figure 3:
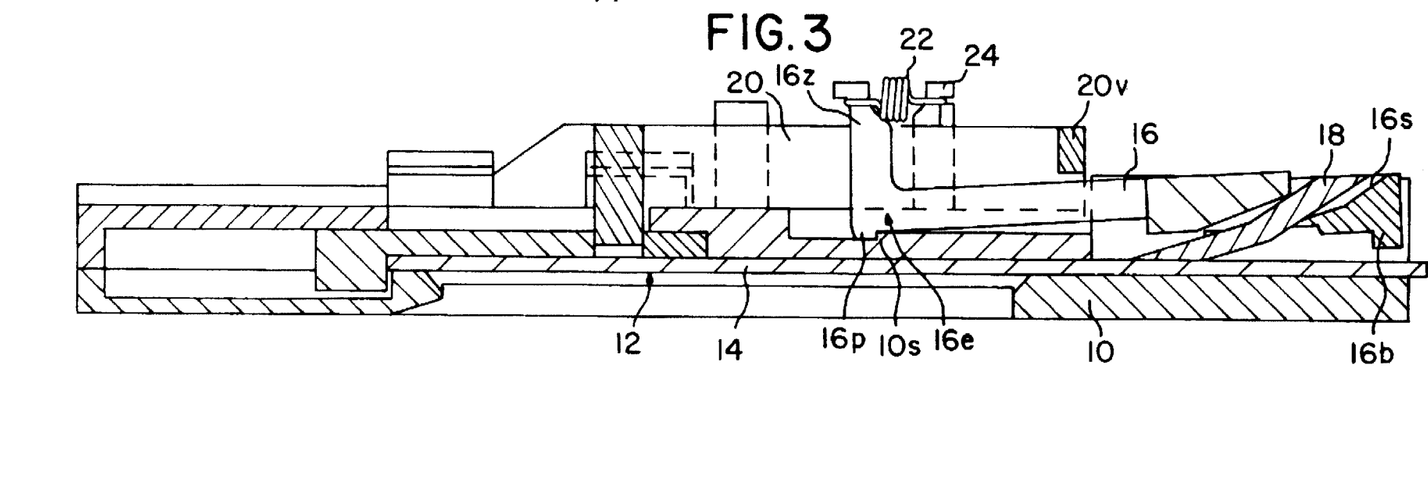
FIG. 3: a longitudinal section along the Line 3—3 in FIG. 1.
Figure 4:
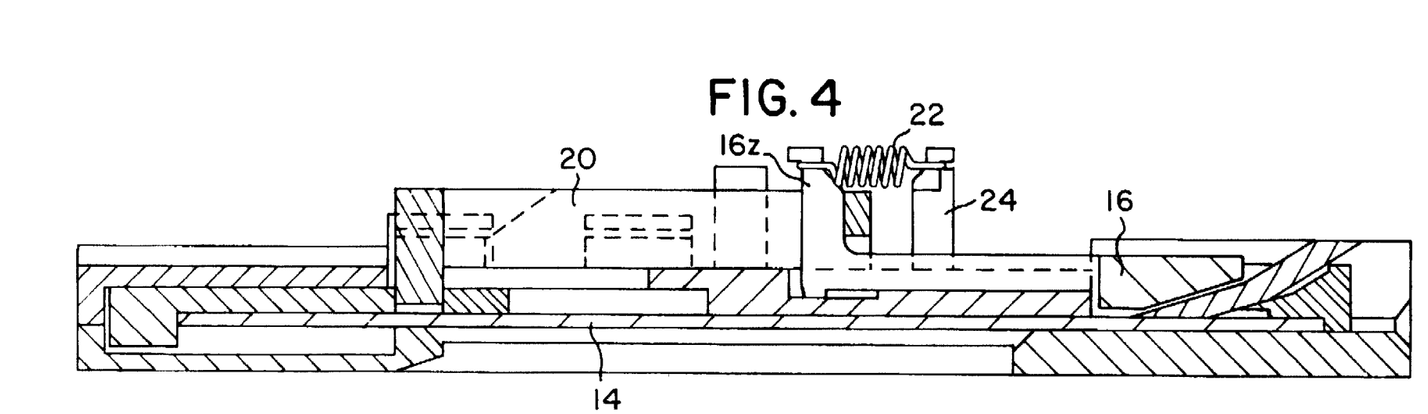
FIG. 4: a longitudinal section along the Line 4—4 of FIG. 2.

Fixed to the free end of the guide stud 16z is one end of a tension spring 22, whose other end is coupled to a pin 24 which is solid with the housing (outside the driver 20) (FIGS. 1, 3).

At the lower end of the guide stud 16z there is fashioned a shoulder 16p which bears against a corresponding shoulder 10s which is solid with the housing (FIG. 3) when the reader is in the initial position (FIGS. 1, 3).

The driver 20 is connected through a plate 25 to a contact carrier 26 with contacts 28 , the contact carrier 26 being guided on the housing 10 by a hinged joint at 30 and being capable of being transferred, along an oblique face 32 from the initial position depicted in FIG. 1 pushes the contact carrier 26 and the driver 20 forward over a stop (not depicted).

FIG. 1 shows that, when the reader is in the initial position, the guide stud 16z is located at a distance from a front frame section 20v of the driver 20. Accordingly, when the chip card 14 is inserted, the arm 16 is not driven until the guide stud 16z pushes against the section 20v of the driver 20. The distance between the guide stud 16z and the section 20v is thus dimensioned so that the front end of the chip card 14 lies immediately in front of the projection 16b as soon as the stud 16z pushes against the section 20v so that, during the further advancement of the chip card 14, the projection 16b is guided almost vertically downwards and behind the edge of the chip card and then latches behind and locks the latter.

In this end position (read position), the contacts 28 of the contact carrier 26 lie directly on the contacts of the chip card 14.

Figure 2:
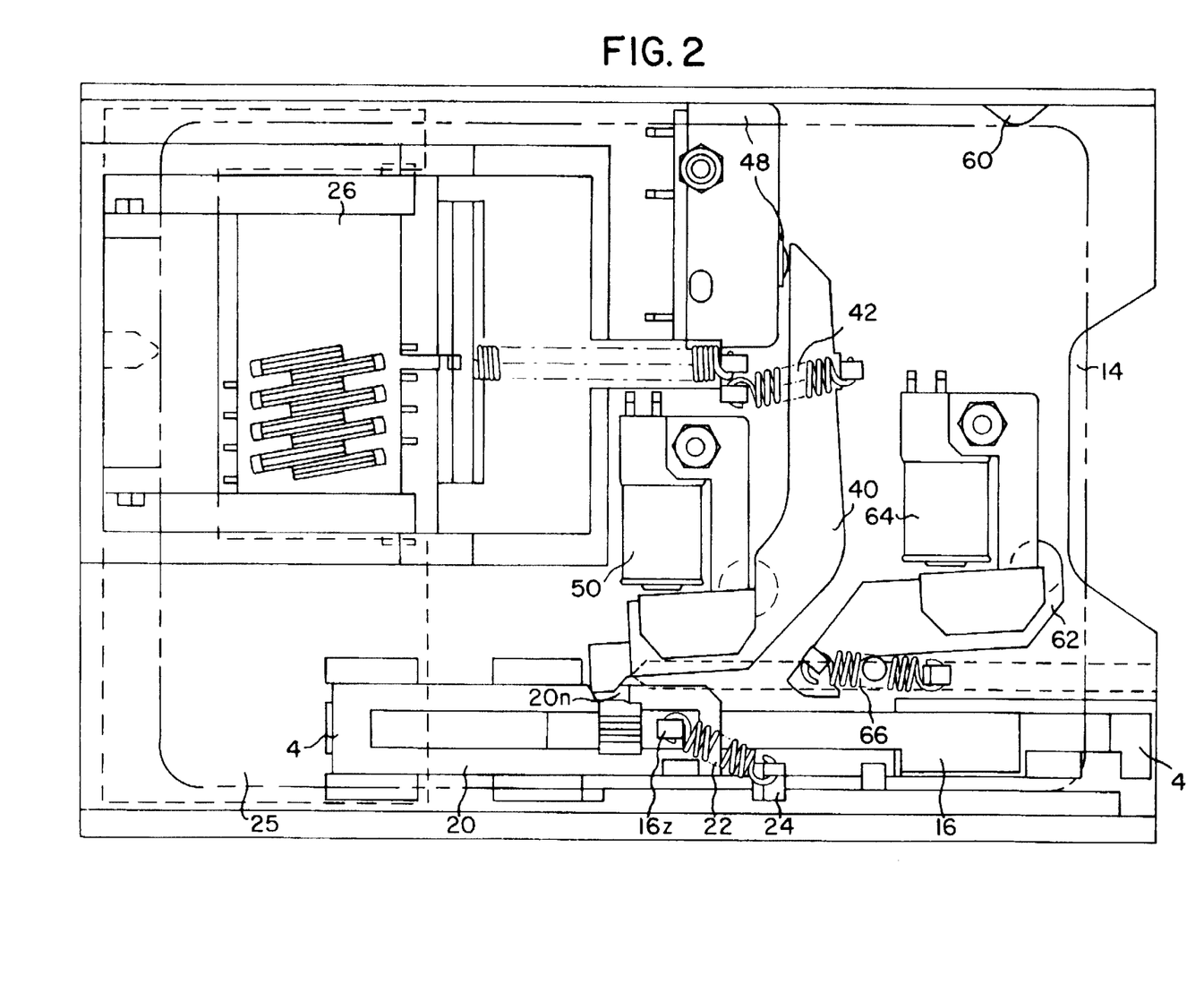
FIG. 2: a top view of a chip card reader in the read position.

Simultaneously, one offset end 40a of a locking slide 40 is latched into a corresponding groove 20n of the driver 20 (FIG. 2). Thereby fixing the driver 20 in position. As shown by FIGS. 1 and 2, the locking slide 40 is also fashioned in an L shape, the longer arm 401 carrying one end of a tension spring 42 whose other end is fixed to a bearing 44 which is solid with the housing. The tension spring thus endeavors to hold The locking slide 40 permanently in the locking position in respect of the driver 20, around a hinge joint which is indicated in schematic form only by reference 46.

Thus, while the section 40a of The locking slide 40 latches into the groove 20n in the outward direction, its opposite end 40e is moved parallel to it in the direction of insertion and thereby acts on a switch 48 which indicates the limit position (read position) of the chip card 14 and activates the electrical contact between the contacts 28 and the contacts of the chip card 14.

If this contact is then broken, for example following termination of a telephone conversation, then a signal is emitted, at the same time, to an electromagnet 50 which is activated accordingly and subsequently attracts metallic section 40m of the locking slide 40 and thereby releases the locking slide 40 again from its engagement in the groove 20n of the driver 20, so that the driver 20 is moved back against the direction of insertion, under the action of the spring 22 and thus releases the chip card 14 from the guideway 12. Simultaneously, and likewise under the action of the spring 22, the arm 16 is guided back into its initial position, along the oblique face 18.

Finally, there is disposed laterally at the entrance of the guideway 12 a switch 60 which projects into the guideway 12 and, accordingly, is capable of being activated by the chip card 14, but only if the reader as a whole is energized. In this case, the switch 60 emits a signal to an electromagnet 64 which acts together with a locking pawl 62 which has an arm 62a with a hook-shaped end 62h which, when the reader is in the initial position, engages in a corresponding recess 20b on the outer surface of the frame-type driver 20 and fixes the latter in position. The locking pawl 62 is only released from engagement with the recess 20b following the emission of a signal to the electromagnet 64 by the switch 60, the electromagnet 64 attracting a metallic section 62m of the locking pawl 62 (not depicted). This is effected against the action of a tension spring 66, one end of which is fixed to the hook 62h and whose other end is fixed to the housing 10.

However, this release is effected only if the reader is energized and the switch 60 can be activated accordingly. If the reader is faulty, the switch 60 remains inactive and the locking of the locking pawl 62 in respect of the driver 20 is maintained, so that in this case it is not possible for a chip card to be brought into the read position, due to the fact that the driver 20 cannot be moved.

The switch 60 may be of any design. In the simplest case, it is a microswitch or membrane switch, which has a high operational reliability and short contact travel.

In order to guide the contact carrier 26 back into the initial position following breaking of the contact with the contacts of the chip card 14, provision is also made here for a tension spring 70, in addition to the spring 22, one end of which is fixed to the front edge of the contact carrier and whose other end is fixed to the housing 10.

We claim:

1. A chip card reader comprising:

a housing;

a guideway provided in the housing, in the longitudinal direction of the latter, for holding a chip card;

a contact carrier, located on the housing, whose contacts are capable of making contact with corresponding contacts of the chip card when the chip card is in the read position; and a locking element which latches behind the chip card in the read position;

wherein:

the locking element consists of an L-shaped arm, capable of motion on the housing, in the longitudinal direction of the latter, the short side of the L being aligned towards the chip card;

the arm is coupled to a driver, located on the housing, which is driven by the chip card on its path into the read position and thereby draws the arm from a position outside the guideway along an oblique face in such a way that the short side of the L-shaped arm latches behind the chip card in the read position; and the driver is secured, so as to be capable of release by a locking slide when the chip card is in the read position.

2. A chip card reader according to claim 1, wherein the driver is fashioned so that it only draws the arm when the chip card has been inserted so far into the guideway that its rear edge—viewed in the direction of insertion—lies in front of the short side of the L-shaped arm.

3. A chip card reader according to claim 1, wherein the driver is fashioned in the form of a frame and the arm is fashioned with a guide stud, on the end opposite to the short side of the L, which projects into the frame of the driver.

4. A chip card reader according to claim 1, wherein the arm is held on the housing under spring load, against the direction of insertion of the chip card.

5. A chip card reader according to claim 1, wherein the driver is connected to the contact carrier which is capable of being guided along an oblique face towards the contacts of the chip card when the chip card is inserted.

6. A chip card reader according to claim 1, wherein the locking element consists of a rocker-type hoop which is spring loaded against the driver.

7. A chip card reader according to claim 1, wherein the locking element has a magnetically active section which acts together with an electromagnet which, following activation, attracts the section and thereby releases the locking slide from its locking position in respect of the driver.

8. A chip card reader according to claim 7, wherein the electromagnet is capable of being coupled to electrical signals of the contacts of the contact carrier.

9. A chip card reader according to claim 1, wherein there is assigned to the locking slide a switch which is capable of being activated by the locking slide when it is transferred into the locking position in respect of the driver.

10. A chip card reader according to claim 1, with a switch, disposed in the guide way, which is capable of being activated by the chip card when it is introduced into the guideway and is electrically connected to an electromagnet which, upon activation of the switch, attracts a locking pawl and releases it, against the action of a spring from a locking position in respect of the driver.

11. A chip card reader according to claim 10, wherein a hook-type projection of the locking pawl engages, in its locking position, in a corresponding recess on the outside of the driver.

12. A chip card reader according to claim 10, wherein the electromagnet is designed so that it releases the locking pawl again as soon as the read position of the chip card is attained.

13. A chip card reader according to claim 1, wherein the driver and the arm are a single piece.

* * * * *

UNITED STATES PATENT AND TRADEMARK OFFICE
CERTIFICATE OF CORRECTION

PATENT NO. : 5,640,307
DATED : Jun. 17, 1997
INVENTOR(S) : Robert BLEIER et al.

It is certified that error appears in the above-indentified patent and that said Letters Patent is hereby corrected as shown below:

On the title page:

After line "[22]" and before line "[51]" insert:

--[30] Foreign Application Priority Data
Apr. 8, 1995 [DE] Fed. Rep. of Germany ...... 195 13 359.5--

Signed and Sealed this

Sixteenth Day of September, 1997

Attest:

BRUCE LEHMAN

Attesting Officer

Commissioner of Patents and Trademarks

UNITED STATES PATENT AND TRADEMARK OFFICE
CERTIFICATE OF CORRRECTION

PATENT NO. : 5,640,307
DATED : June 17, 1997
INVENTOR(S) : Robert Bleier, et al.

Page 1 of 5

It is certified that error appears in the above-identified patent and that said Letters Patent is hereby corrected as shown below:

Insert item 56 on the title page:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 9 | 1 | 7 | 3 | 7 | 2 | 11/04/75 | Selinko | | | |
| | | 4 | 2 | 3 | 6 | 6 | 6 | 7 | 12/02/80 | Crowley et al. | | | |
| | | 4 | 2 | 8 | 8 | 1 | 4 | 0 | 09/08/81 | Griffith et al. | | | |
| | | 4 | 5 | 7 | 5 | 7 | 0 | 3 | 03/11/86 | Shishido | | | |
| | | 4 | 7 | 1 | 7 | 8 | 1 | 7 | 01/05/88 | Grassi et al. | | | |
| | | 4 | 7 | 2 | 4 | 3 | 1 | 0 | 02/09/88 | Shimamura et al. | | | |
| | | 4 | 7 | 3 | 4 | 5 | 6 | 7 | 03/29/88 | Hansbauer | | | |
| | | 4 | 7 | 3 | 5 | 5 | 7 | 8 | 04/05/88 | Reichardt et al. | | | |
| | | 4 | 7 | 5 | 2 | 2 | 3 | 4 | 06/21/88 | Reichardt et al. | | | |
| | | 4 | 7 | 7 | 0 | 6 | 3 | 9 | 09/13/88 | Lau | | | |
| | | 4 | 7 | 9 | 5 | 8 | 9 | 7 | 01/03/89 | Chalendard | | | |
| | | 4 | 7 | 9 | 9 | 8 | 9 | 1 | 01/24/89 | Reichardt et al. | | | |
| | | 4 | 8 | 1 | 4 | 5 | 9 | 3 | 03/21/89 | Reichardt et al. | | | |
| | | 4 | 8 | 7 | 4 | 3 | 2 | 3 | 10/17/89 | Shibano | | | |
| | | 4 | 9 | 0 | 0 | 2 | 7 | 3 | 02/13/90 | Pernet | | | |
| | | 4 | 9 | 3 | 2 | 8 | 8 | 9 | 06/12/90 | Bleier et al. | | | |
| | | 4 | 9 | 7 | 5 | 0 | 8 | 6 | 12/04/90 | Reichardt et al. | | | |
| | | 4 | 9 | 7 | 6 | 6 | 3 | 0 | 12/11/90 | Schuder et al. | | | |

UNITED STATES PATENT AND TRADEMARK OFFICE
CERTIFICATE OF CORRRECTION

PATENT NO. : 5,640,307
DATED : June 17, 1997
INVENTOR(S) : Robert Bleier, et al.

It is certified that error appears in the above-identified patent and that said Letters Patent is hereby corrected as shown below:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 1 | 9 | 6 | 6 | 8 | 0 | 03/23/93 | Schuder | | | |
| | | 5 | 2 | 5 | 9 | 7 | 7 | 7 | 11/09/93 | Schuder et al. | | | |
| | | 5 | 2 | 6 | 9 | 7 | 0 | 7 | 12/14/93 | Reichardt et al. | | | |
| | | 5 | 3 | 2 | 0 | 5 | 5 | 2 | 06/14/94 | Reichardt et al. | | | |
| | | 5 | 3 | 3 | 4 | 0 | 3 | 4 | 08/02/94 | Reichardt et al. | | | |
| | | 5 | 3 | 3 | 4 | 8 | 2 | 7 | 08/02/94 | Bleier et al. | | | |
| | | 5 | 3 | 3 | 6 | 8 | 7 | 7 | 08/09/94 | Raab et al. | | | |
| | | 5 | 3 | 6 | 9 | 2 | 5 | 9 | 11/29/94 | Bleier et al. | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | DE | 3 | 6 | 2 | 5 | 3 | 0 6 | A1 | 01/28/88 | Germany | | | | |
| | DE | 8 | 6 | 0 | 5 | 5 | 2 2 | U1 | 11/05/87 | Germany | | | | |
| | CH | 6 | 7 | 7 | 4 | 1 | 1 | A5 | 05/15/91 | Switzerland | | | | |
| | EP | 0 | 4 | 6 | 8 | 1 | 7 9 | A1 | 06/10/91 | EPO | | | | |
| | DE | 3 | 9 | 3 | 1 | 5 | 0 6 | A1 | 04/04/91 | Germany | | | | |
| | DE | 3 | 8 | 3 | 2 | 5 | 8 8 | A1 | 03/29/90 | Germany | | | | |
| | DE | 3 | 5 | 3 | 1 | 3 | 1 8 | A1 | 03/05/87 | Germany | | | | |
| | EP | 0 | 3 | 3 | 3 | 5 | 3 0 | | 09/20/89 | EPO | | | | |

UNITED STATES PATENT AND TRADEMARK OFFICE
CERTIFICATE OF CORRRECTION

PATENT NO. : 5,640,307

DATED : June 17, 1997

INVENTOR(S) : Robert Bleier, et al.

It is certified that error appears in the above-identified patent and that said Letters Patent is hereby corrected as shown below:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | EP | 0 | 1 | 8 | 6 | 7 | 3 7 | 07/09/86 | EPO | | | | |
| | DE | 3 | 3 | 4 | 3 | 7 | 2 7 A1 | 06/13/85 | Germany | | | | |
| | DE | 3 | 3 | 4 | 3 | 7 | 5 7 A1 | 06/13/85 | Germany | | | | |
| | DE | 3 | 4 | 0 | 2 | 6 | 3 2 A1 | 08/01/85 | Germany | | | | |
| | DE | 3 | 4 | 4 | 2 | 3 | 9 7 A1 | 05/22/86 | Germany | | | | |
| | DE | 2 | 9 | 5 | 2 | 4 | 4 2 A1 | 07/17/80 | Germany | | | | |
| | | 2 | 6 | 0 | 7 | 2 | 8 7 | 05/27/88 | France | | | | |
| | | 2 | 4 | 8 | 9 | 5 | 5 8 | 03/05/82 | France | | | | |
| | DE | 3 | 6 | 0 | 2 | 6 | 6 8 A1 | 07/30/87 | Germany | | | | |
| | EP | 0 | 2 | 5 | 4 | 3 | 1 6 | 01/27/88 | EPO | | | | |
| | | 2 | 6 | 3 | 3 | 7 | 5 0 | 01/05/90 | France | | | | |
| | DE | 3 | 8 | 1 | 0 | 2 | 7 5 A1 | 10/05/89 | Germany | | | | |
| | DE | 3 | 6 | 0 | 2 | 6 | 6 8 A1 | 07/30/87 | Germany | | | | |
| | DE | 3 | 4 | 4 | 3 | 5 | 6 1 A1 | 05/28/86 | Germany | | | | |
| | EPO | 2 | 1 | 4 | 4 | 7 | 8 | 03/18/87 | EPO | | | | |
| | EPO | 3 | 1 | 6 | 6 | 9 | 9 | 05/24/89 | EPO | | | | |
| | EPO | 2 | 7 | 4 | 5 | 3 | 4 | 07/20/88 | EPO | | | | |
| | EPO | 1 | 3 | 9 | 5 | 9 | 3 | 05/02/85 | EPO | | | | |
| | DE | 3 | 8 | 0 | 8 | 1 | 8 3 | 09/22/88 | Germany | | | | |
| | | | | | | | | | | | | | |

Page 3 of 5

UNITED STATES PATENT AND TRADEMARK OFFICE
CERTIFICATE OF CORRRECTION

PATENT NO. : 5,640,307
DATED : June 17, 1997
INVENTOR(S) : Robert Bleier, et al.

Page 4 of 5

It is certified that error appears in the above-identified patent and that said Letters Patent is hereby corrected as shown below:

OTHER DOCUMENTS (Including Author, Title, Date, Pertinent Pages, Place of Publication, Etc.)

IBM Technical Disclosure Bulletin, Vol. 20, No. 5, October 1977, " Actuator Assembly for a Disk File"

UNITED STATES PATENT AND TRADEMARK OFFICE
CERTIFICATE OF CORRRECTION

PATENT NO. : 5,640,307
DATED : June 17, 1997
INVENTOR(S) : Robert Bleier, et al.

It is certified that error appears in the above-identified patent and that said Letters Patent is hereby corrected as shown below:

OTHER DOCUMENTS (Including Author, Title, Date, Pertinent Pages, Place of Publication, Etc.)

| |
|---|
| IBM Technical Disclosure Bulletin, Vol. 20, No. 5, October 1977, "Actuator for a Disk File" |
| Abstract of Japanese Published Pat. Appln. No. 60-022795, Patent Abstracts of Japan, Feb. 5, 1985 |
| Decker Maschineneiemente, 9th Edition, pp. 92-94 |

Signed and Sealed this

Nineteenth Day of October, 1999

Attest:

Q. TODD DICKINSON

Attesting Officer

Acting Commissioner of Patents and Trademarks